Aug. 15, 1939.   J. F. SMITH   2,169,981

APPARATUS FOR APPLYING PRESSURE TO SHOE SOLES

Filed Aug. 14, 1935   5 Sheets-Sheet 1

INVENTOR
John Frederick Smith
BY
Watson, Bristol, Johnson & Leavenworth
ATTORNEYS Aug. 15, 1939.   J. F. SMITH   2,169,981
APPARATUS FOR APPLYING PRESSURE TO SHOE SOLES
Filed Aug. 14, 1935   5 Sheets-Sheet 3

INVENTOR
John Frederick Smith
BY
Watson, Bristol, Johnson & Leavenworth
ATTORNEYS Patented Aug. 15, 1939

2,169,981

UNITED STATES PATENT OFFICE 2,169,981

APPARATUS FOR APPLYING PRESSURE TO SHOE SOLES

John Frederick Smith, Quincy, Mass., assignor to Compo Shoe Machinery Corporation, New York, N. Y., a corporation of Delaware Application August 14, 1935, Serial No. 36,053

24 Claims. (Cl. 12—36)

This invention relates to shoe manufacturing equipment, and more particularly to an apparatus for applying pressure to shoe soles in operations, such as sole-leveling, sole-affixing, channel laying, and the like.

A general object of the invention is to provide an improved form of sole-pressing apparatus, which is adapted to be rapidly operated with a minimum expenditure of the operator's time.

More particularly, objects of the invention are to provide sole-pressing equipment, including a plurality of inflatable shoe presses and means for inflating a press positioned opposite a shoe loading station, wherein such inflating means is adapted to continue in operation during subsequent movement of the press away from such station, thereby utilizing the period of conveyor movement for inflating purposes and avoiding delays heretofore occasioned through the necessity of having to hold the presses stationary until fully inflated.

Further objects of the invention are to provide a shoe pressing machine which is largely automatic in its operation, and in which the time element allotted to the various essential operations, such as press loading, inflating, deflating, conveyor moving, unloading, etc. are efficiently distributed so as to enable an operator to handle more shoes over a given period of time.

Other objects of the invention will in part be obvious and will in part appear hereinafter.

The invention accordingly comprises the features of construction, combination of elements and arrangement of parts, which will be exemplified in the construction hereinafter set forth and the scope of the invention will be indicated in the claims.

For a fuller understanding of the nature and objects of the invention reference should be had to the following detailed description taken in connection with the accompanying drawings, in which.

The apparatus of the present invention is useful in any operation in which it is desired to apply pressure to the sole of a shoe and is especially advantageous in operations such as sole-conforming or leveling where the outsole is already attached to the shoe upper, and the entire shoe assembly may be very rapidly inserted in a press. It comprises a plurality of sole presses each having an inflatable pressure applying pad and means for holding a shoe thereagainst. These presses are moved past a loading station, where an operator inserts a shoe therein and inflates the press pad. The press is then moved by means of a suitable carrier or conveyor and a succeeding press is brought to the loading station, where the shoe contained therein is removed and a new one loaded into the press. In order to facilitate such removal, the press pad preferably is deflated prior to its arrival at the operator's station. Various machines of this general type have heretofore been in use, one example of such being shown in the Weiss Patent No. 1,945,762, issued February 6, 1934.

With these earlier machines it has been found that an appreciable time element is involved both for inflating a press and for deflating it. Thus, with a press pad of conventional construction and volume, inflation may be effected with a head of air under 50 to 60 pounds pressure (which is conventional) in about 3½ seconds, while a longer period of from 7 to 10 seconds is required to deflate such a pad. The operation of simply placing a finished shoe in a press in order to conform or level its sole is a very rapid one, taking only about 1½ seconds. If, after loading, the press must be kept stationary during an inflating operation the machine must stand idle during a considerable portion of the operator's working time, and this period of idleness is even more disproportionate if the press is held stationary during the deflating period.

In accordance with a salient feature of the present invention, the time element used for moving the presses from station to station is overlapped with the inflating and deflating time periods, so that the operator may load shoes in the press as rapidly as he wishes and pass the presses along their path, without pausing for the inflating and deflating time intervals. Such a construction very materially increases the daily output of a given operator, and since most operators work on a piece-work basis, this is of advantage from the standpoint both of the worker and of the manufacturer.

Figure 1:
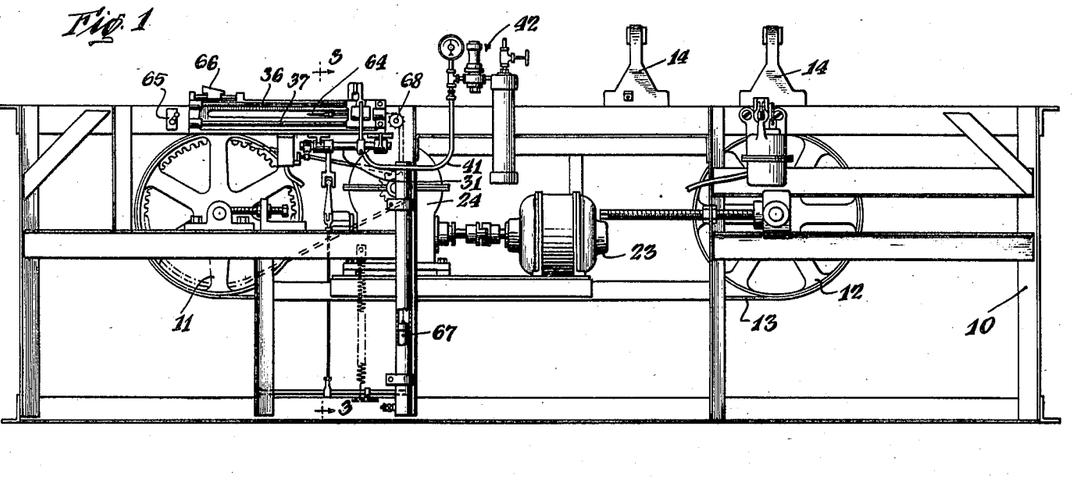
Fig. 1 is a rear elevation of a sole-pressing machine embodying principles of this invention, showing a solenoid type of deflating mechanism and also having some of the presses removed in the interest of clarity.
Figure 2:
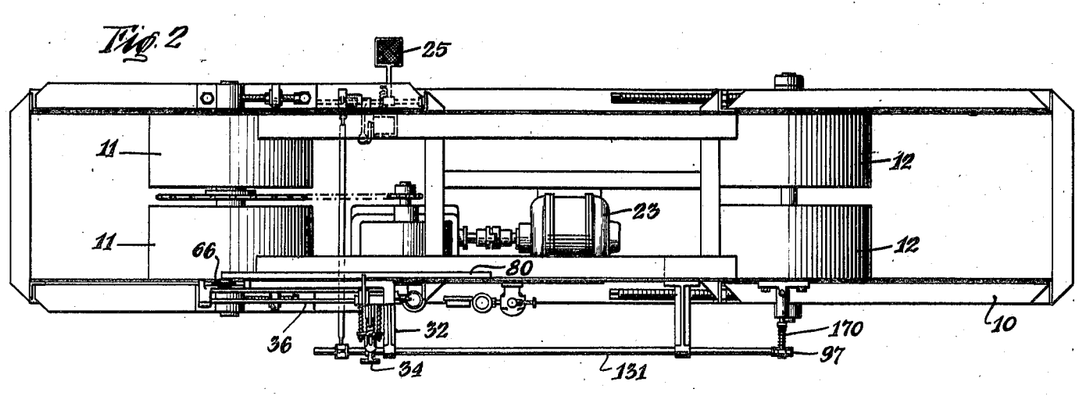
Fig. 2 is a plan view of the machine shown in Fig. 1, except that an alternative mechanical form of deflating mechanism is illustrated, the conveyor belt and its associated presses being removed in order better to show the remaining construction.

Referring more particularly to the drawings, there is shown in Fig. 1 a sole-pressing apparatus comprising an elongate frame generally designated 10 at the ends of which double belt drums 11 and 12 are mounted. A flexible elongate belt 13 is passed around these drums, and the latter are adjustably mounted on the frame, as illustrated, to enable such belt properly to be tensioned.

Figure 3:
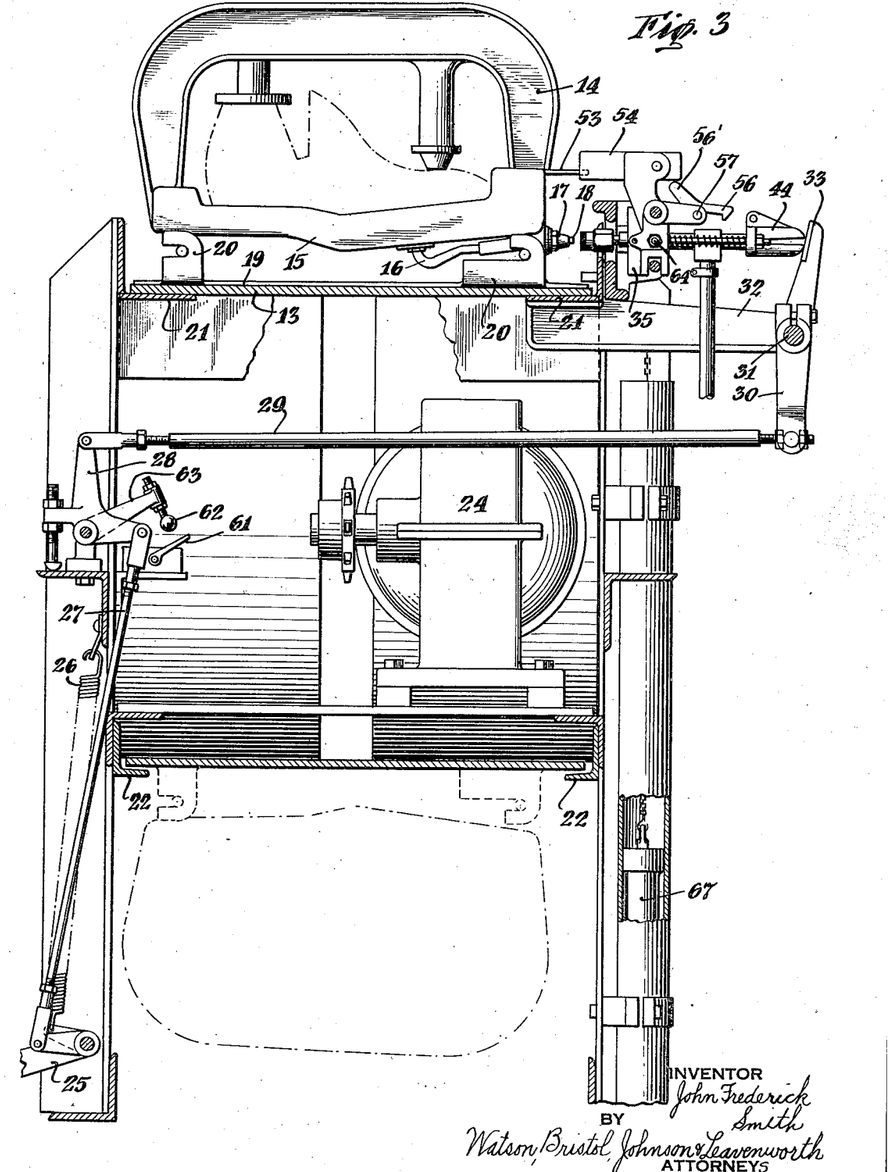
Fig. 3 is a transverse vertical sectional view on an enlarged scale, taken along line 3—3 of Fig. 1.

A plurality of shoe presses 14 are mounted on this belt at suitable intervals. These presses may be of any conventional or desired construction, provided they have an inflatable pad which is adapted to press against a shoe bottom and suitable means for holding a shoe thereagainst. A preferred form of press is generally illustrated in Fig. 3, and follows the construction shown in the Patent No. 2,059,847 issued to William C. Card, Jr., on November 3, 1936. Such press comprises a base portion 15 which is hollowed to receive an air pressure pad (not shown), which is adapted to be inflated and deflated through a conduit 16 having a valve 17 at its rear end. This is a familiar type of air valve having a depressible plunger 18, which is associated with suitable spring biased valve seat mechanism adapted to open the conduit when the plunger is depressed and to close it when the plunger is expanded. The press further comprises a bow member having toe and heel posts adapted to hold the shoe against upward movement. Each press is mounted on a cleat member 19, having upstanding press supporting lugs 20. Tracks 21 are mounted on opposite sides of the frame to support the upper belt traverse and similar tracks 22 are provided to support the belt and cleat members along the lower conveyor traverse. A driving motor 23 is mounted on the frame and is coupled through a suitable speed-reducing mechanism, designated 24, with one of the conveyor drums so as to rotate the same and move the conveyor whenever the control switch for the motor is closed. This motor switch is adapted to be operated by means hereinafter described, so as to start and stop the motor and intermittently to move the presses so that they successively pause opposite a loading station where the operator is positioned.

A foot treadle 25 is located at the forward side of the machine near the loading station and is normally held upwardly by a spring 26. This treadle is connected by means of a link 27 with a bell crank lever 28, which is connected by means of another link 29 with a crank 30 keyed to a shaft 31 (Figs. 1 and 3), which is freely rotatable in brackets 32 fixed to the machine frame. An arm 33 is keyed to shaft 31 and has a slightly elongated head 34 at the upper end thereof (Figs. 4 and 5), which is adapted to abut and move an air chuck mechanism into inflating relation with a press valve 17.

Figure 4:
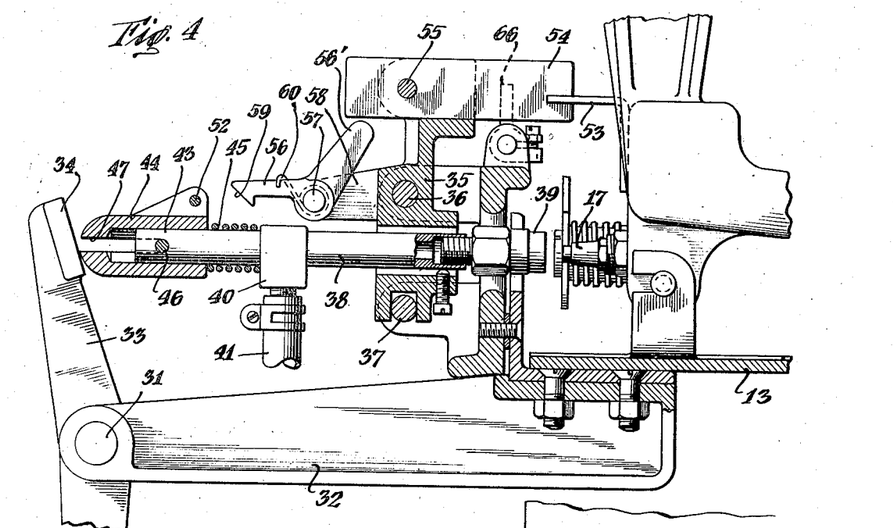
Fig. 4 is a fragmentary transverse sectional view, on a further enlarged scale, showing details of an air-inflating mechanism.
Figure 5:
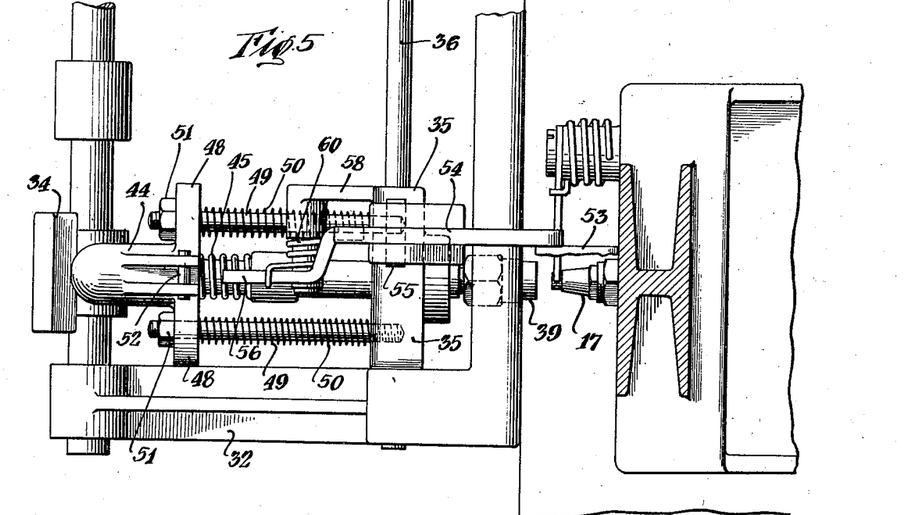
Fig. 5 is a fragmentary top plan view of the construction shown in Fig. 4.
Figures 6, 7, 8:
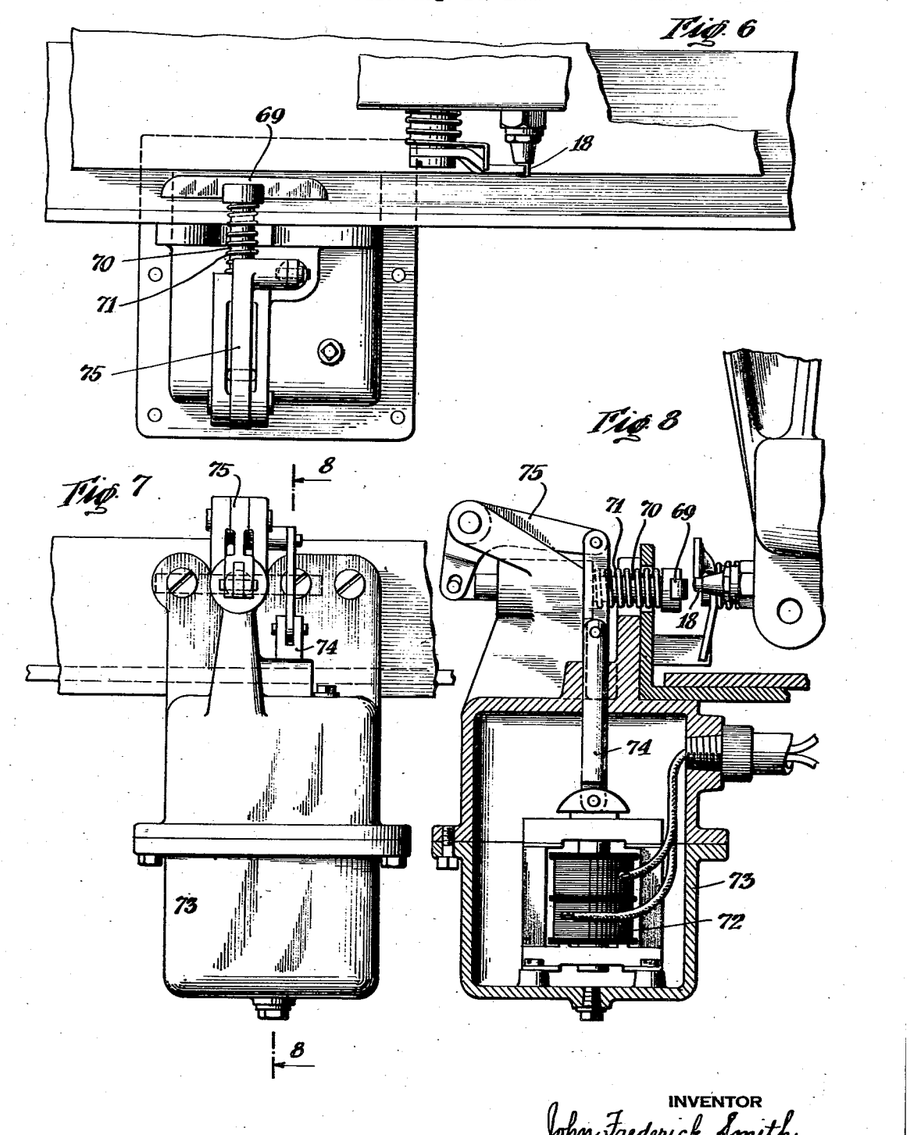
Fig. 6 is a fragmentary top plan view on an enlarged scale, showing details of a solenoid deflating mechanism.
Fig. 7 is a fragmentary rear elevation of the device shown in Fig. 6.
Fig. 8 is a fragmentary transverse sectional view taken along line 8—8 of Fig. 7.
Figure 9:
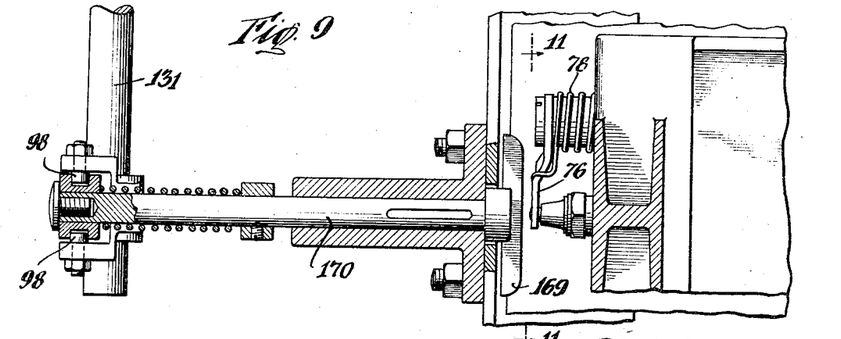
Fig. 9 is a fragmentary horizontal sectional view on an enlarged scale, showing a detail of another form of a mechanical deflating mechanism.

This inflating mechanism, which is best shown in Figs. 4 and 5, comprises a sliding carriage 35 which is mounted for movement along guide rods 36 and 37, which are fixed to and extend along the carrier frame from the vicinity of the loading station to a distance therebeyond exceeding the distance between successive presses, or, in other words, for at least one station beyond the loading station. This carriage has an air chuck pipe 38 slidably mounted therein for movement toward and from the presses on the conveyor belt. An air chuck 39 having a normally closed valve of known construction which is adapted to open when in contact with a valve such as valve 17, is mounted on the inner end of the sliding air chuck pipe at the level of the path of the air valves 17. The pipe 38 has an air connection 40 located thereon which communicates with a flexible conduit 41 that is connected with a suitable source of compressed air supply (not shown) through a gauge and constant-pressure valve mechanism generally indicated at 42. The flexible conduit 41 is looped and is of sufficient length to permit the carriage 35 to travel freely back and forth along its guide rods 36 and 37 within its intended limits. A chuck extension 43 is continued rearwardly beyond the pipe connection 40 and has a head 44 slidably telescoped thereover. A compression spring 45 is located between this head and the connection 40 and tends normally to urge these members apart. A transverse pin 46 is passed through the extension 43 and is accommodated in lateral slots 47 provided in the sliding head 44 so as to arrest outward movement of the latter with respect to the extension. The head 44 is provided with lateral wings 48, each of which is perforated to pass slidably over one of a pair of retaining bolts 49 which are fixedly screwed into the carriage 35. Compression springs 50 are provided on each bolt 49 and react between the carriage and the sliding head 44, normally to urge the latter into its outermost position where it is arrested by nuts 51 on the outer ends of the retaining bolts. The sliding head 44 has a latch pin 52 mounted between upstanding ears located on the upper side thereof.

Means for alining the chuck 39 with a press valve 17 are provided in the form of an outstanding lug 53 which is affixed to each press in position to contact a lever 54 pivotally mounted at 55 on the carriage 35. The lug 53 and lever 54 are so positioned on their respective press and carriage that when they contact each other, as in Figs. 4 and 5, the chuck 39 and press valve 17 are in alinement. When thus alined, downward movement of the treadle 25 will cause forward or inward movement of the arm 33 so that the latter abuts and moves head 44, which, through the action of spring 45 on the enlarged connection 40, slides the pipe 38 through its supporting carriage 35, bringing the chuck 39 into inflating relation with valve 17. This inward movement of the sliding head is opposed by springs 49, which are made weak enough not seriously to interfere with the described air-coupling operation. The pin and slot connection at 46 and 47 permit some further inward movement of head 44 even after an air-coupling contact has been effected, and such continued movement serves to press the spring 45 against the connection 40 so as to store energy therein.

Means are provided for holding the air chuck 39 in inflating relation with a valve 17 after release of the arm 33 and during movement of the press along the conveyor traverse. This means comprises a latch 56 which is pivotally mounted on a pin 57 affixed to a projecting stud 58 on the sliding carriage 35. This latch has an inclined nose 59, which is spring-biased by means of a spring 60 normally into alinement with the latch pin 52, and it is adapted to ride over and hold the latter when the head 44 has been sufficiently advanced. The advance needed to effect this is somewhat greater than that needed to contact the chuck 39 in inflating relation with the valve 17, so that some compression of spring 45 will be necessary in order to bring the pin 52 into held relation with its latch 56. Therefore, whenever the air chuck is latched against the press valve it is held thereto under spring tension imposed by reaction of the spring 45 between head 44 and connection 40, head 44 acting when latched as a relatively fixed abutment with respect to the carriage 35.

With the inflating parts in the above described condition, the press may be continued along its traverse, and the carriage 35 will be moved therewith so long as the lug 53 and lever 54 remain in abutment, and the chuck 39, which is mounted on the carriage, will move along with the press valve, being held against the same under spring pressure, as described. In order thus to move the press away from its loading and initial inflating position, a motor-starting switch 61 (Fig. 3) is located in the path of a trip finger 62 mounted on an arm 63 which is movable with the bell crank 28. Thus continued depression of treadle 25 will cause finger 62 to move switch 61, which is normally spring-biased to open position, downwardly into circuit closing position so as to start the driving motor. The switch-starting arm 63 is so positioned with respect to the treadle linkage mechanism that it does not close the starting switch until after latch 56 is seated over latch pin 52, that is, until after the air chuck is held in inflating relation against an alined press valve.

Upon closure of switch 61 the motor starts and moves the upper traverse of the conveyor to the left as viewed in Fig. 1. The press lug 53 carries lever 54 and its associated sliding carriage 35 and other appurtenant parts mounted thereupon along with the press until the next succeeding press approaches the vicinity of the loading station. The motor current is then turned off and the conveyor allowed to come to a drift stop. The means for turning off the motor comprises a forwardly projecting finger 64 (Fig. 1) which is mounted on and movable with the carriage 35 and is located between the carriage guide rods 36 and 37 in position to contact and trip open a motor stopping switch 65, which is normally spring-biased to circuit closing position. When the current is thus shut off, the conveyor drifts to a stop.

As the conveyor comes to its drift stop the lever 54 rides up along an inclined cam 66, which is fixedly positioned along the conveyor frame. Such cam serves to elevate the forward end of lever 54 until it clears the press lug 53, so that the sliding carriage 35 is not compelled further to partake of the press movement. At the same time, the rearward end of lever 54 is depressed into contact with a tail 56' which is positioned therebeneath and is formed integrally with the chuck-holding latch 56. Depression of the latch tail 56' elevates the latch and frees it from the pin 52, enabling springs 49 to withdraw the chuck from air-inflating relation with the press valve 17 so that the former is free to return to its initial position at the loading station.

When the carriage is thus released from the press and the chuck is withdrawn from the press valve, these parts are returned to the vicinity of the loading station by means of a counterweight 67, which is attached to the carriage 35 by a chain running over a sprocket 68 on the frame. The counterweight preferably slides in a guide tube mounted on the conveyor frame as illustrated. The motor is turned off and the conveyor stopped during the time the counterweight is returning the carriage, and the operator utilizes this interval to load the succeeding press which is now positioned at the loading station. The carriage is pulled toward this press until its lever 54 abuts the lug 53 provided thereon, so that the chuck once again is in alinement with a press valve and the inflating mechanism of the machine is ready for a repeated inflating operation.

It is desirable that the loaded presses arriving at the loading station be deflated when they reach that point. To this end deflating mechanism is provided at a station in advance of the loading station. One desirable form of such mechanism is shown in Figs. 1, 6, 7 and 8. This comprises a slightly elongated bar 69 mounted on a plunger 70, which, in the presently illustrated device, is located three stations in advance of the loading station in position to have the bar 69 contact the lower portion of the valve plunger 18 on a press located at such a position. A spring 71 normally urges the bar 69 outwardly into deflating contact with the valve plunger. The deflating bar is adapted to be held retracted against its bias by means of a solenoid 72 which is connected across the motor terminals so as to be energized when the motor is moving and to be de-energized while the conveyor is at rest. The solenoid is mounted in a suitable housing 73 mounted on the conveyor frame, which may contain oil or like cooling fluid. The armature of the solenoid, which is positioned vertically, is connected by means of a link 74 with a bell crank lever 75 having an arm pivoted with a suitable loose motion connection to the deflating plunger 70, so that downward movement of the solenoid armature serves to retract the plunger.

Figures 10, 11, 12:
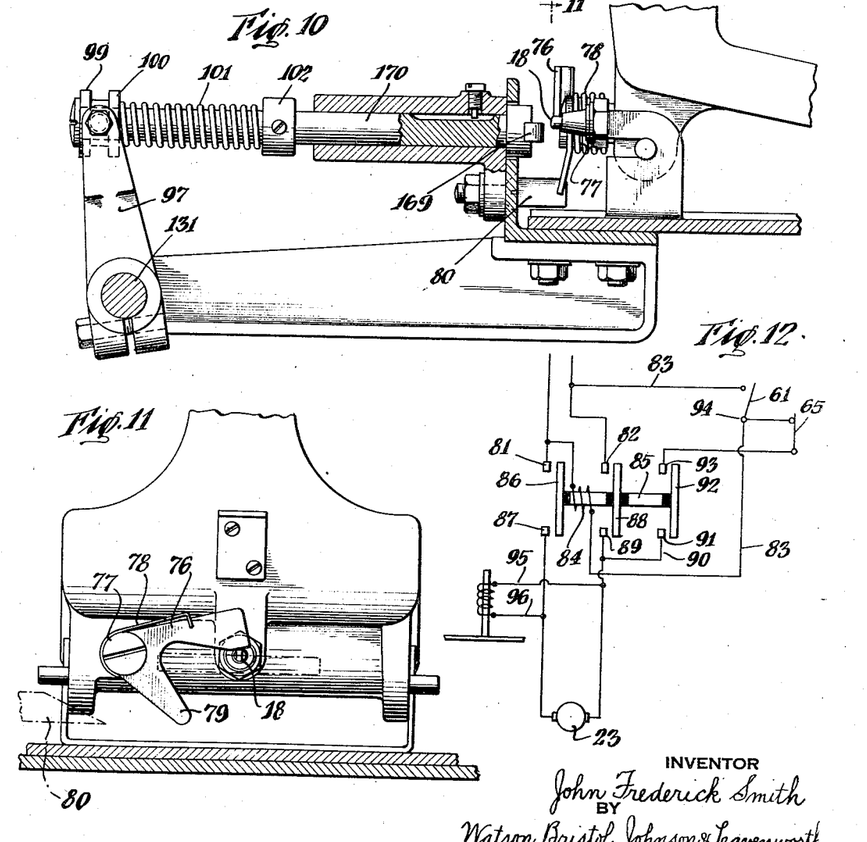
Fig. 10 is a fragmentary transverse vertical sectional view showing the structure of Fig. 9.
Fig. 11 is a fragmentary rear elevation showing a detail of the individual press construction.
Fig. 12 is a wiring diagram of the control circuit for the conveyor driving and press deflating mechanisms.

A valve latch 76, best shown in Fig. 11, is pivotally mounted on a stud 77 on each press, and has an arm which is spring-biased at 78 into contact with the upper side of the press plunger 18. When the bar 69 pushes such plunger into deflating position the spring 78 moves the latch 76 partly across the forward face of the plunger, in which position the latch is stopped by a suitable stop pin (not shown) so that it holds the plunger in its deflating position during subsequent movement of the press toward the loading station. The latch continues in this position until a tail 79, which is integral therewith, wipes across a cam 80 which is positioned along the conveyor frame so as to lift the latch out of the way of the valve and clear of the inflating mechanism at a point somewhat in advance of the loading station. This cam 80 continues as far as the air chuck release cam 66, so that the latch is held free of the inflating mechanism so long as the latter is coupled with the press.

By virtue of this construction a press in advance of the loading station is deflated by bar 69 and its deflating valve is held open preferably over at least two periods of intermittent conveyor movement so that the pad is fully deflated by the time it reaches the loading station. As soon as the conveyor moves, the bar 69 is retracted by the solenoid so that it is held clear of the press path until a succeeding press becomes alined therewith. This solenoid deflating arrangement is substantially like that shown and claimed in my Patent No. 2,078,588, April 27, 1937, and the press latch construction is substantially like that shown and claimed in my Patent No. 2,015,764 issued October 1, 1935. These do not constitute a part of the present invention except in so far as they are used in combination with the other novel construction herein disclosed.

In Fig. 12 the electrical circuit for the driving motor and solenoid is shown. Current from any suitable source is led into terminals 81 and 82. A pilot lead 83 is run from terminal 82 to the starting switch 61 and thence through the coil 84 of a magnetic switch 85 and back to the terminal 81. The magnetic switch 85 is given a normal spring bias to the right as viewed in Fig. 12, but upon closing the starting switch 61 the coil at 84 is energized so as to draw the core of switch 85 to the left and to bring a conductor 86 into contact with terminal 81 and a motor terminal 87, and also to bring a conductor 88 into contact with terminal 82 and another motor terminal 89, thus connecting the driving motor 23 with a source of current so as to start the motor and begin movement of the press carrier. Soon after the carrier begins to move, the operator releases the starting treadle 25 and thus permits the starting switch 61 to open. In order to hold the switch 85 against its bias until a new press is brought to a drift stop at the loading station, an energizing current for the switch coil 84 is run through the stop switch 65, which is closed except when moved by the finger 64 on the carriage 35. With the motor started and the magnetic switch 85 closed and the drift stop switch 65 closed, current from the terminal 82 passes through conductor 88 to the terminal 89 and thence through a pilot lead 90 to a terminal 91, thence across a conductor 92 of the magnetic switch to a terminal 93, thence through the closed stop switch 65 to a switch terminal 94, where it continues around the pilot lead 83 through the coil 84 and back through terminal 81, closing the magnetic switch coil circuit. Since the starting switch 61 has already been opened shortly after starting movement of the conveyor by release of treadle 25, the subsequent opening of stop switch 65 through the abutment of finger 64 thereagainst will de-energize the coil 84 and allow magnetic switch 85 to open in accordance with its spring bias, thus cutting off the motor 23. The motor starting and stopping mechanism will then be in position for repeated action through subsequent closing of starting switch 61, as soon as the finger 64 releases the switch 65 following return of the carriage by its counterweight.

Leads 95 and 96 of the deflating plunger solenoid 72 are connected across the terminals of the driving motor 23 as shown, so that solenoid 72 is energized and de-energized simultaneously with the motor, or, in other words, is energized with the closing of starting switch 61 and is de-energized with the opening of stop switch 65.

In Figs. 2, 9, 10 and 11 an alternative mechanical form of deflating plunger is shown. Here, the shaft carrying the rocker arm 33 is elongated as shown at 131 in Fig. 2 and has an arm 97 affixed thereto opposite a deflating plunger 170, which is slidably mounted in a bracket provided on the press frame at a deflating position, preferably located three stations in advance of the loading station, just as in the above described solenoid arrangement. The arm 97 is bifurcated at its upper end and equipped with inwardly extending pins 98 (Fig. 9) which operate in lateral vertical slots 99 on a head 100 which is slidably mounted on the plunger 170. A spring 101 is located between this head and a collar 102 on the plunger so that inward movement of arm 97 is transmitted therethrough to the deflating plunger so as to move the deflating bar 169 of the latter into deflating contact with a valve plunger 18. The presses are equipped with valve latches 76, as above described, so that once the plunger 18 is thus depressed it is adapted to be so held until released by the cam 80.

Arm 97 is so located on shaft 131, with respect to the arm 33 for moving the inflating mechanism and with respect to the starting switch control arm 63, that, upon depression of treadle 25, the deflating bar 169 will first operate against its opposed valve plunger, and the arm 33 will next operate to bring the air chuck into inflating relation with a valve on a press of the loading station, the continued movement needed to effect this being permitted by the deflating plunger spring 101. After the deflating and inflating arms 97 and 33 are thus operated, the treadle is further depressed so that the chuck latch 56 operates and is then further depressed until the starting motor 61 is closed.

When using the machine the operator stands at the loading station adjacent treadle 25. Assuming the machine to have been in operation, a deflated press having a finished shoe will be located at such station. This is removed by the operator and another shoe is loaded in the press. The treadle 25 then is depressed sufficiently to operate the deflating plunger 169 (when this form of deflating equipment is used), so as to enable the press latch 76 to hold the valve of a press at the deflating station open. Depression of the treadle 25 is continued, usually without pause, until the arm 33 moves the chuck 39 into inflating relation with the valve 17 of a press at the loading station. This relation is effected somewhat before the latch 56 seats over latch pin 52, so that if the work is misalined or for any other reason the operator wishes to effect a pause in the inflating operation, after inflating contact has been established between the chuck and the valve, he may release the chuck by permitting the treadle 25 to raise. That is, if necessary, inflation can be stopped at the inflating station and the press deflated by hand to remedy any maladjustment or the like, before the conveyor movement is started. Ordinarily, however, the movement of arm 33 is continued after the chuck 39 contacts valve 17 until the latch 56 settles over latch pin 52 and positively holds the chuck in inflating relation. This continued movement is permitted by the spring 45 at the inflating station and spring 101 on the deflating plunger. A slight further depression of the treadle 25 then moves finger 62 into contact with switch 61 and starts the motor. When the conveyor is thus moved, carriage 35 and its associated air chuck are carried along with the press so as to continue the inflating operation during press movement, until stop switch finger 64 on the carriage trips the stop switch 65, bringing the conveyor to a drift stop. During this drifting movement the press coasts sufficiently to ride lever 54 up on cam 66 so as to free the carriage from the now fully inflated press and also to trip the chuck latch 56 so that the chuck is withdrawn under influence of springs 49 and the carriage is free to return to the starting station under the influence of counterweight 67. This return movement of the carriage is continued until lever 54 abuts the lug 53 of a succeeding deflated press which is now positioned at the loading station, and the entire operation may be repeated. Deflation is automatically cared for by means of the deflating plungers 70 or 170 and the latches 76 on each press, the latter being held clear of the inflating mechanism by cam 80 when in the inflating zone.

It will be seen that an apparatus has been provided which is able rapidly and efficiently to carry out sole-pressing operations, such as conforming, leveling, sole-affixing, channel laying and the like.

While a preferred construction has been described in detail, such description is illustrative and it will be understood that various departures may be made from the specifically illustrated mechanism within the scope of the invention. Thus, for example, other suitable carriers, such as rotatable tables, wheels, and the like, may be used in conjunction with described inflating and deflating mechanisms, so long as the former is guided so as to follow the carrier path.

Since certain changes may be made in the above construction and different embodiments of the invention could be made without departing from the scope thereof, it is intended that all matter contained in the above description or shown in the accompanying drawings shall be interpreted as illustrative and not in a limiting sense.

It is also to be understood that the following claims are intended to cover all of the general and specific features of the invention herein described, and all statements of the scope of the invention which, as a matter of language, might be said to fall therebetween.

Having described my invention, what I claim as new and desire to secure by Letters Patent, is:

1. In a sole pressing machine, the combination comprising a movable carrier, a plurality of sole presses mounted on said carrier and each having an inflatable pad and means for holding a shoe thereon, means for moving said carrier step by step, an air inlet on each press, an inflating device mounted near said carrier for movement therewith, means for alining said device with the air inlet of a press positioned at a station along said carrier, means for moving said device toward and into inflating relation with an alined inlet, and means for holding said device and inlet coupled during one step of carrier movement.

2. In a sole pressing machine, the combination comprising a movable carrier, a plurality of sole presses mounted on said carrier and each having an inflatable pad and means for holding a shoe thereon, means for moving said carrier step by step, an air inlet on each press, an inflating device mounted near said carrier for movement therewith, means for alining said device with the air inlet of a press positioned at a station along said carrier, means for moving said device toward and into inflating relation with an alined inlet, means for holding said device and inlet coupled during one step of carrier movement, and means for releasing said device from said inlet at the end of said step.

3. In a sole pressing machine, the combination comprising a movable carrier, a plurality of sole presses mounted on said carrier and each having an inflatable pad and means for holding a shoe thereon, means for moving said carrier step by step, an air inlet on each press, an inflating device mounted near said carrier for movement therewith, means for alining said device with the air inlet of a press positioned at a station along said carrier, means for moving said device toward and into inflating relation with an alined inlet, means for holding said device and inlet coupled during one step of carrier movement, means for releasing said device from said inlet at the end of said step, means for retracting said released device from said inlet, and means for returning it to its initial position for cooperation with a succeeding press.

4. In a sole pressing machine, the combination comprising a plurality of shoe presses, each having an inflatable pad and means for holding a shoe thereon, means for moving said presses along a path having a loading station, an inflating device mounted near said path for linear movement therealong, means for coupling said device in inflating relation with a press at said station and for maintaining said relation during movement of such press until the next press reaches said station, means for uncoupling said device, and means for returning it to said station for cooperation with said next press.

5. In a sole pressing machine, the combination comprising a movable carrier, a plurality of sole presses mounted on said carrier and each having an inflatable pad and means for holding a shoe thereon, an air inlet on each press, means for moving said carrier step by step, a guide along the path of said carrier, a carriage slidable along said guide, an air supply chuck slidably mounted in said carriage for movement toward and from said inlets, means on said carriage and press for alining said chuck and an air inlet on a press located at a station along said carrier traverse, and means for coupling said chuck with said alined inlet during movement of said press beyond said station.

6. In a sole pressing machine, the combination comprising a flexible elongate carrier providing a rectilinear traverse, a plurality of shoe presses mounted on said carrier and each having an inflatable pad and means for holding a shoe thereon, means for intermittently moving said carrier successively to present presses at a loading station, an inflating device mounted near said rectilinear traverse for movement therealong, means for coupling said device in inflating relation with a press at said loading station and for maintaining said relation during movement of such press until the next press reaches said station, means for uncoupling said device, and means for returning it to said station for cooperation with said next press.

7. In a sole pressing machine, a flexible elongate conveyor providing a rectilinear traverse passing a loading station, a plurality of shoe presses on said conveyor each having an inflatable pad and means for holding a shoe thereon, means for moving said conveyor step by step, means for inflating a press located at said loading station and for continuing said inflation during a step of conveyor movement, and means for returning said inflating means to said loading station at the end of said step.

8. In a sole pressing machine, the combination comprising a plurality of shoe presses each having an inflatable pad and means for holding a shoe thereon, means for moving said presses along a path having a loading station, an air inlet on each press for its pad, a carriage movable along said path, an air supply chuck carried by said carriage and movable toward and from such inlet, means for moving said chuck into inflating relation with the inlet of a press at said loading station, and latch means for holding said chuck in such relation during movement of said press away from said station.

9. In a sole pressing machine, the combination comprising a plurality of shoe presses each having an inflatable pad and means for holding a shoe thereon, means for moving said presses along a path having a loading station, an air inlet on each press for its pad, a guide mounted along said path, a carriage slidable along said guide, an air chuck slidable on said carriage for movement toward and from said air inlets, means for alining said chuck with the inlet of a press at said station, spring means normally urging said chuck out of the path of said inlets, means for moving said chuck into inflating relation with an alined inlet, means for holding said chuck in such relation, and means for moving said carriage and chuck along with said press when it leaves said station.

10. In a sole pressing machine, the combination comprising a plurality of shoe presses each having an inflatable pad and means for holding a shoe thereon, means for moving said presses along a path having a loading station, an air inlet on each press for its pad, a guide mounted along said path, a carriage slidable along said guide, an air chuck mounted on said carriage for movement toward and from said air inlets, means for alining said chuck with the inlet of a press at said station, a head movably mounted on said carriage, a spring between said head and chuck, means for moving said head to urge said chuck into inflating relation with an alined valve, and means for holding said head fixed with respect to said carriage when said chuck is in such relation during movement of said press away from said station.

11. In a sole pressing machine, the combination comprising a plurality of shoe presses each having an inflatable pad and means for holding a shoe thereon, means for moving said presses along a path having a loading station, an air inlet on each press for its pad, a guide mounted along said path, a carriage slidable along said guide, an air chuck mounted on said carriage for movement toward and from said air inlets, means for alining said chuck with the inlet of a press at said station, a head slidably mounted on said carriage for moving said chuck into inflating relation with an alined inlet, spring cushion means between said head and chuck, a latch for holding said head fixed with respect to said carriage when said chuck is in said inflating relation, spring means normally urging said head away from said presses, and a loose motion connection between said head and chuck for withdrawing the latter from the path of said inlets when said last named spring means is operative.

12. In a sole pressing machine, a shoe press having an inflatable pad and means for holding a shoe thereon, a valve communicating with said pad, an air supply chuck, means for moving said chuck against said valve, and separate latchable means for holding said chuck in such position under spring tension after release of said chuck moving means.

13. In a sole pressing machine, a shoe press having an inflatable pad and means for holding a shoe thereon, an inlet for said pad, an air supply chuck mounted for movement toward said inlet, a head movable to urge said chuck against said inlet, a latch for holding said head when said chuck is so located, and spring means between said head and chuck holding the latter against said inlet under spring pressure.

14. In a sole pressing machine, the combination comprising a plurality of shoe presses each having an inflatable pad and means for holding a shoe thereon, means for moving said presses along a path having a loading station, an air inlet on each press for its pad, an air supply chuck, means for moving said chuck against the inlet of one of said presses, and latchable means for holding said chuck in such position under spring tension during movement of said press away from said station and from said chuck moving means.

15. In a sole pressing machine, the combination comprising a plurality of shoe presses each having an inflatable pad and means for holding a shoe thereon, means for moving said presses along a path having a loading station, an air inlet on each press for its pad, an air supply chuck, means for moving said chuck against the inlet of one of said presses, means for holding said chuck in such position under spring tension during movement of said press away from said station, and means for releasing said chuck from said inlet after travel of said press to a succeeding station.

16. In a sole pressing machine, the combination comprising a plurality of shoe presses each having an inflatable pad and means for holding a shoe thereon, means for moving said presses along a path having a loading station, an air inlet on each press for its pad, an air supply chuck, means for moving said chuck against the inlet of one of said presses, means for holding said chuck in such position under spring tension during movement of said press away from said station, means for releasing said chuck from said inlet after travel of said press to a succeeding station, and means for returning said chuck to said loading station for cooperation with a succeeding press.

17. In a sole pressing machine, the combination comprising a plurality of shoe presses each having an inflatable pad and means for holding a shoe thereon, means for moving said presses along a path having a loading station, an air inlet on each press for its pad, an air chuck mounted for movement along said path, means for alining said chuck with the inlet of a press positioned at said station, means for moving said chuck into inflating relation with an alined inlet, latch means holding said chuck in such relation during movement of said press away from said station, and means including a cam fixed along said path beyond said station for tripping said latch means to release said chuck.

18. In a sole pressing machine, the combination comprising a plurality of shoe presses each having an inflatable pad and means for holding a shoe thereon, means for moving said presses along a path having a loading station, an air inlet on each press for its pad, a carriage mounted for movement along said path, an air chuck mounted for movement on said carriage toward and from said air inlets, a lever on said carriage adapted to abut part of a press at said station to aline said chuck and the inlet of said press, and to compel said carriage to partake of movement of said press, means for moving said chuck into inflating relation with said inlet while said press is at said station, latch means holding said chuck in such relation during movement of said press away from such station, a cam fixed along said path beyond said station in position to move said lever out of engagement with said press part, said lever being arranged to release said latch means when moved by said cam.

19. In a sole pressing machine, the combination comprising a plurality of shoe presses each having an inflatable pad and means for holding a shoe thereon, means for moving said presses along a path having a loading station, an air inlet on each press for its pad, a carriage mounted for movement along said path, an air chuck mounted for movement on said carriage toward and from said air inlets, a lever on said carriage adapted to abut part of a press at said station to aline said chuck and the inlet of said press, and to compel said carriage to partake of movement of said press, means for moving said chuck into inflating relation with said inlet while said press is at said station, latch means holding said chuck in such relation during movement of said press away from such station, a cam fixed along said path beyond said station in position to move said lever out of engagement with said press part, said lever being arranged to release said latch means when moved by said cam, and means for returning said carriage toward its initial position until said lever abuts part of a succeeding press at said station.

20. In a sole pressing machine, the combination comprising a carrier movable along a path having a loading station, a plurality of sole presses mounted on said carrier and each having an inflatable pad and means for holding a shoe thereon, an electric motor, driving connections between said motor and carrier for moving the latter when the motor is running, an air inlet on each of said presses, a starting switch and a stopping switch for said motor, a carriage movable along the path of said carrier, an air chuck movable on said carriage toward and from the inlet of a press at said station, actuating means for moving said chuck into inflating relation with said named inlet, latch means for holding said chuck in such relation, a connection on said actuating means adapted to close said starting switch after said latch means operates, means for moving said carriage and chuck with said press away from said station, and means carried by said carriage for contacting and opening said stopping switch.

21. In a sole pressing machine, the combination comprising a carrier movable along a path having a loading station, a plurality of sole presses mounted on said carrier and each having an inflatable pad and means for holding a shoe thereon, an electric motor, driving connections between said motor and carrier for moving the latter when the motor is running, an air inlet on each of said presses, an air chuck movable into inflating relation with the inlet of a press located at said station, means operable upon such chuck being moved toward said inlet for holding said chuck in such relation during movement of the carrier, common actuating means for moving said chuck into said inflating relation and for starting said motor, and means for stopping said motor when a succeeding press reaches said station.

22. In a sole pressing machine, the combination comprising a carrier movable along a path having a loading station, a plurality of sole presses mounted on said carrier and each having an inflatable pad and means for holding a shoe thereon, an electric motor, driving connections between said motor and carrier for moving the latter when the motor is running, an air inlet on each of said presses, an air chuck movable into inflating relation with the inlet of a press located at said station, means operable upon such chuck being moved toward said inlet for holding said chuck in such relation during movement of the carrier, common actuating means for moving said chuck into said inflating relation and for starting said motor, means for stopping said motor when a succeeding press reaches said station, means for releasing said chuck, and means for returning it to said station for cooperation with said succeeding press.

23. A machine for applying pressure to shoe bottoms having, in combination, a plurality of inflatable pads each arranged to receive a sole and shoe, abutments for each pad for engaging the shoe, mechanism for moving each pad in turn into and out of an operating station, means movable toward and away from the pads for inflating each pad in turn to apply pressure to the sole and shoe mounted thereon, mechanism at the operating station for moving said inflating means, and means for locking said inflating means in operative position before the pad moves out of the operating station, thereby causing said inflating means to move out of said station with the pad and to inflate the pad during such movement.

24. In a sole pressing machine, the combination comprising a plurality of shoe presses each having an inflatable pad and means for holding a shoe thereon, means for moving said presses along a path having a loading station, an air inlet on each press for its pad, an air supply chuck, means for moving said chuck against the inlet of one of said presses, means for holding said chuck in such position under spring tension during movement of said press away from said station, means for releasing said chuck from said inlet after travel of said press away from said station, and means for returning said chuck to said loading station for cooperation with a succeeding press.

JOHN FREDERICK SMITH.